United States Patent [19]

Hernández Crespo

[11] 4,190,082
[45] Feb. 26, 1980

[54] ADJUSTABLE DISTRIBUTION VALVE

[75] Inventor: Mariano Hernández Crespo, Madrid, Spain

[73] Assignee: Empresa Nacional de Ingenieria y Tecnologia, S.A., Madrid, Spain

[21] Appl. No.: 906,373

[22] Filed: May 16, 1978

[30] Foreign Application Priority Data

May 20, 1977 [ES] Spain .............................. 228.623[U]

[51] Int. Cl.² ............................................. F16K 11/07
[52] U.S. Cl. .......................... 137/625.17; 137/625.48; 137/872
[58] Field of Search .................. 137/625.17, 872, 876, 137/625.48

[56] References Cited

FOREIGN PATENT DOCUMENTS 816942 7/1959 United Kingdom ................ 137/625.48

Primary Examiner—Gerald A. Michalsky
Attorney, Agent, or Firm—Ladas, Parry, Von Gehr, Goldsmith & Deschamps

[57] ABSTRACT

An adjustable distribution valve comprises a body defining first and second axially-aligned branches and a third branch extending laterally thereof, substantially in the form of a T. A plug element is fitted in the passage formed by the axially-aligned branches and is movable therewithin. The plug element is bounded by a cylindrical surface of diameter equal to the diameter of the passage, and two opposed concave surfaces which intersect the cylindrical surface at a point substantially halfway along the plug element and at opposite ends of the plug element at positions which are diametrically opposite said point. The plug is movable longitudinally within the passage between a first position in which it distributes fluid received by way of the third branch to both the first and second branches, a second position in which it blocks the first branch and directs fluid received by way of the third branch to the second branch, and a third position in which it blocks the second branch and directs fluid received by way of the third branch to the first branch.

4 Claims, 1 Drawing Figure

U.S. Patent
Feb. 26, 1980
4,190,082
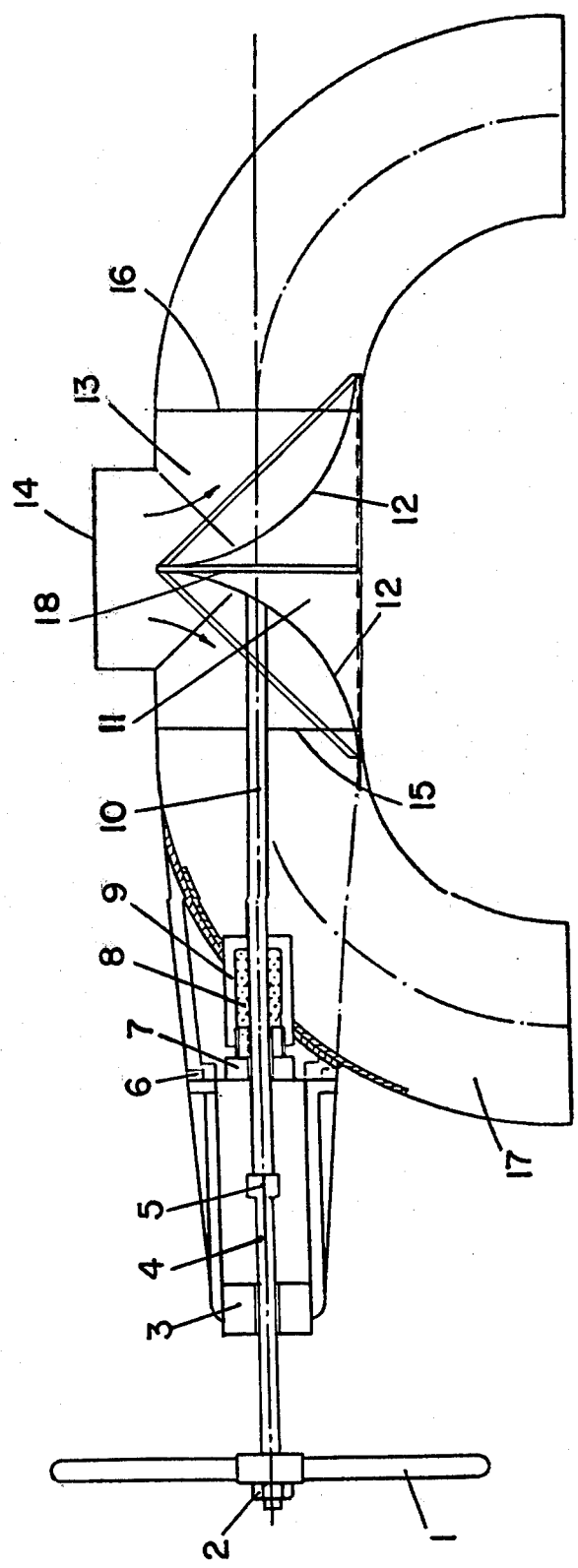

ADJUSTABLE DISTRIBUTION VALVE

This invention relates to a valve for drawing off liquids, especially liquids having peculiar characteristics such as high density or viscosity, high abrasive power and the propensity to solidify when at rest, said valve permitting these liquids to be directed at will to one or another branch of a bifurcated pipe.

Until now, the drawing off of such liquids was done with conventional-type valves based on the plugging of the orifices through which the liquid product circulated, with frequent scaling and failure owing to the physical characteristics of the product. Use has also been made of other similar systems based on the choke plugging of flexible sections, their inconvenience being that a good portion of the product is left isolated. Both forms of sealing are defective in the sense that they fail to prevent accumulation of the product in dead or standstill zones, and in addition they are costly, their maintenance is difficult and expensive and at time entire valves rendered useless by scale must be replaced.

It is desired, with the valve of the present invention, to fulfil first the function of a leaktight seal, and second to avoid, by means of a special functional arrangement, the standstill or accumulation zones of the product where until now there has been sedimentation, scaling and hardening.

The valve of this invention consists of a central T-shaped housing body having one intake and two outlets, the terminal openings of which end in standard pipe flanges of a diameter and specifications in accordance with the different pressures of the products being handled. The in-line branches of the said T-shaped body, in which the intake is located in the crosswise branch and the outlets are in the said in-line branches, contain a displaceable plug or seal the shape of which is determined by the intersection of a cylindrical surface of a diameter corresponding to the diameter of the bore in which it is inserted and two opposed concave surfaces extending from the middle point of the plug element situated in front of the valve intake to the extreme ends thereof at points of a generatrix of the cylinder situated in position diametrically opposed to that of said middle point, so that the plug, activated by a rod coaxial thereto, can adopt any intermediate position between a centered position, in which the fluid is equally distributed to one and the other outlet, and two end positions in each of which the corresponding outlet is completely closed, the other remaining completely open, the fluid circulating past the face of the plug element forming part of the open passage pipe, and the closed branch remaining free of liquid which has been expelled by the plug itself by its closing movement.

The great advantage of this plug or seal lies in the fact that it can occupy, in addition to any intermediate position within the valve body, four alternative end positions, that is, the three already specified of diverting the product in equal parts to both branches or in its entirety to one or the other branch, and the position of total closure which is achieved by making the plug rotate on its longitudinal axis, so that the flared or widened part completely seals off the liquid intake orifice.

The plug fulfils the important task of converting the working part thereof, along with the part of the valve housing, into one more section of pipe through which the products circulate without any projection altering their laminar or turbulent flow.

The following is a description of the object of the invention in greater detail, reference being made to an embodiment thereof as represented in the accompanying schematic drawing, the single FIGURE of which shows a sectional view of an adjustable distribution valve.

The valve arrangement illustrated in the drawing comprises a T-shaped housing body 13, containing an intake 14 and two outlets 15 and 16 connected by means of pipe flanges to the respective intake and outlet pipes, at least one outlet pipe being curved toward the side opposite to that containing the intake, for the purpose which will be immediately explained.

The housing 13 contains a plug or seal 11 the shape of which is determined by the intersection of a cylindrical surface corresponding to the bore of the in-line parts of the T-shaped housing 13 and two opposed concave surfaces 12 which extend from both ends of the plug 11 and converge upon a middle point thereof situated in the diametrically opposed generatrix.

The plug 11 has a coaxial drive rod 10 which extends beyond the outlet pipe 17, owing to the curvature of the latter, through a sleeve 9 with a packing 8, ending in an operating handwheel 1 fastened to its end by means of a nut 2. Said drive rod 10 has a threaded end portion 4 which passes through a threaded member 3 in such manner that turning of the handwheel 1 in one direction or another causes the longitudinal displacement of the plug 11 in one or another direction. The threaded member 3 is mounted, at a certain distance from the adjacent surface of the curved pipe 17, in a housing frame 6 which surrounds the packing and sleeve part 8, 9. A member 7, screwed to the extreme end of the sleeve 9, determines along with the threaded member 3 a traveling space corresponding to the stroke of travel of the plug 11 between its maximum positions, which maximum positions are determined by a stop 5 positioned in the rod 10, upon making contact with either of the threaded members 3 and 7.

When the plug acts only to distribute the fluid from the intake 14 to one of the outlets 15 or 16, or to both as is shown in the drawing, the rod 10 and the plug are joined or locked together in their longitudinal movement but are free to turn with respect to one another, with the result that the turning of the handwheel and consequently of the rod 10 is converted into longitudinal or axial movement of the plug. However it is also possible, when it is desired to completely seal off the fluid intake 14, to make the plug 11 and the rod lock together in rotation so that as the rod turns the plug turns also, for the purpose of situating the wide or flared portion of the latter in diametrically opposed position, thereby completely closing the intake 14.

The means (not shown) for locking the plug 11 and rod 10 together in rotation can consist of a narrowed portion of parallel surfaces in the end of said rod, and a recess of corresponding shape in the plug into which the said narrowed portion can be introduced when it is desired to make the plug turn in its centered position.

Alternatively, the means for locking the handwheel 1 and the plug 11 together in rotation can be located in the stop member 5, which is hollow, and inside of which terminate the ends of two separated parts of the rod 10, of which the threaded part 4 bears a species of fork which turns inside a sleeve of the part 10 provided with an orifice in which a pin can be radially inserted in unblocked position and retained against the force of a spring, so that when said pin is manually freed it will enter, after a certain angle of turn of the member 4, the fork thereof to thus lock together the two parts of the drive rod.

To achieve a leaktight seal with the described valve, in any of the maximum positions of the plug, a triple leakproof joint of special design has been provided having three annular branches, the central of which, designated 18 in the drawing, is applied peripherally to the cylindrical surface of the plug, while the other two branches are applied to the edges of the two opposed concave surfaces, the three branches being joined in the narrow portion of the plug.

What is claimed:

1. An adjustable distribution valve having an inlet opening and two outlet openings and comprising a generally T-shaped body defining first, second and third branches, the first and second branches being axially aligned, being provided respectively by the horizontal limbs of the T, and defining the two outlet openings respectively and the third branch being provided by the vertical stem of the T and defining the inlet opening, and the valve further comprising a plug element fitted in the passage defined by the axially-aligned first and second branches and movable therewithin, and an actuating rod secured to the plug element and extending therefrom axially within the first branch and through the outlet opening defined thereby, said plug element being bounded by a cylindrical surface of diameter equal to the diameter of said passage, and two opposed concave surfaces which intersect said cylindrical surface at a point substantially halfway along the plug element and at opposite ends of the plug element at positions which are diametrically opposite said point with respect to said cylindrical surface, the plug being movable longitudinally within said passage by means of said actuating rod between a first position, in which said point confronts the inlet opening and the plug element distributes fluid received by way of said inlet opening to both outlet openings, a second position, in which the plug element blocks said first branch and directs fluid received by way of said inlet opening to the outlet opening defined by said second branch, and a third position, in which the plug element blocks said second branch and directs fluid received by way of said inlet opening to the outlet opening defined by said first branch.

2. A valve as claimed in claim 1, wherein the plug element is rotatable within said passage by means of said actuating rod to a fourth position, in which said point is diametrically opposite the inlet opening and said inlet opening is blocked by the cylindrical surface of the plug element.

3. A valve as claimed in claim 1, wherein the plug element is provided with three sealing rings extending about said cylindrical surface, one of the three sealing rings extending about the periphery of the cylindrical surface which extends through said point and the other two sealing rings extending about the intersections of said cylindrical surface and said concave surfaces respectively.

4. A valve as claimed in claim 1, wherein said actuating rod has two ends, one of which is provided with a handwheel and the other of which is secured to the plug element in a manner to permit rotation of the rod relative to the plug element, and the rod is provided with a screwthread between its ends, and the valve further comprises a nut which is fixed relative to said body and is in threaded engagement with the screwthread of said rod, whereby rotation of said rod by means of the handwheel brings about longitudinal movement of said plug element.

* * * * *